P. H. BLACK.
PAIL HOLDER.
APPLICATION FILED AUG. 23, 1917.
1,268,916.
Patented June 11, 1918.
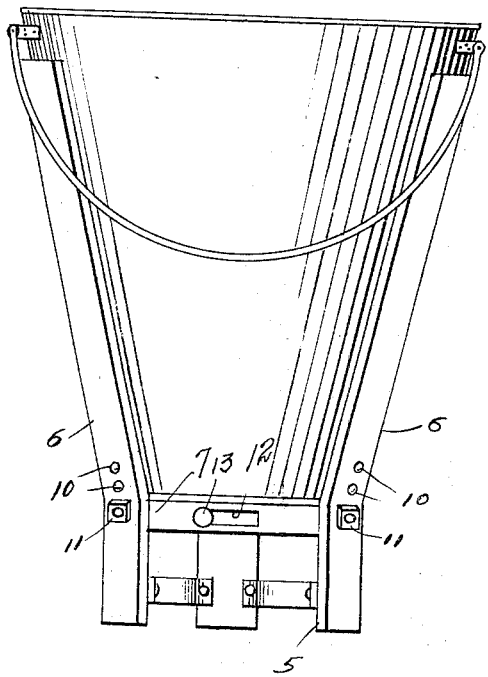
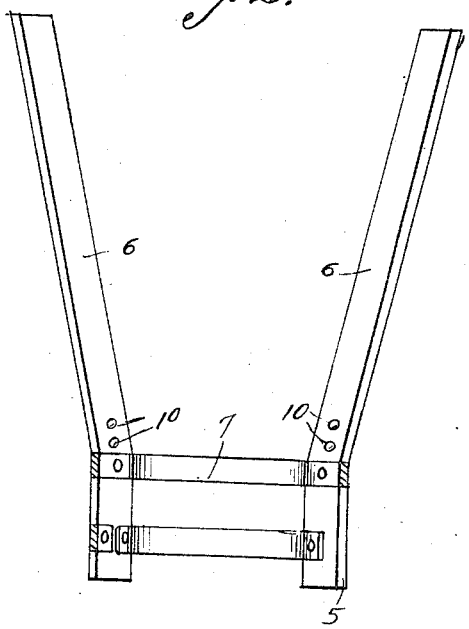
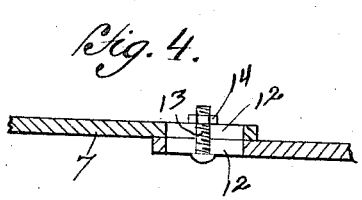
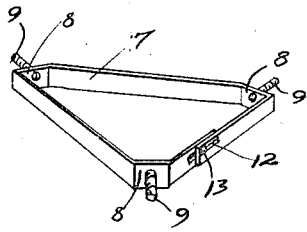
Inventor
P. H. Black
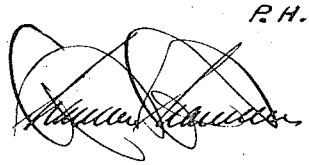

UNITED STATES PATENT OFFICE.

PAUL H. BLACK, OF ALGONA, IOWA.

PAIL-HOLDER.

1,268,916.  Specification of Letters Patent.  Patented June 11, 1918.

Application filed August 23, 1917. Serial No. 187,816.

*To all whom it may concern:*

Be it known that I, PAUL H. BLACK, a citizen of the United States, residing at Algona, in the county of Kossuth, State of Iowa, have invented certain new and useful Improvements in Pail-Holders; and I do hereby declare the following to be a full, clear, and exact description of the invention, such as will enable others skilled in the art to which it appertains to make and use the same.

This invention is an improvement in supports and has particular reference to a holder for milk pails and the like.

An object of the invention is to provide an improved holder of simple and inexpensive construction for supporting the bottom of a pail above the ground whereby the same will be prevented from becoming soiled.

Another object is to provide the holder with an adjustable supporting member, the position of which in the holder may be varied so as to accommodate buckets of different sizes.

The inventive idea involved is capable of receiving a variety of mechanical expressions, one of which, for the purpose of illustrating the invention, is shown in the accompanying drawing, wherein:—

Figure 1 is a side elevation of the holder showing a bucket in position therein.

Fig. 2 is a vertical sectional view.

Fig. 3 is a detail perspective view of the supporting member.

Fig. 4 is a sectional view showing the manner of adjusting the supporting member to vary the size thereof.

In the drawing the numeral 5 indicates the base of the holder which may be made of any preferred material and configuration and which has extending therefrom a plurality of resilient arms 6, preferably three in number, the upper portions of which are disposed in diverging relation whereby to receive the tapered sides of a bucket therebetween.

The supporting member 7 is preferably formed from a single strip of material bent into substantially triangular formation, the corners of which are flattened as indicated at 8 and carry bolts 9 adapted to extend through any one of a plurality of vertically alined openings 10 formed in the arms 6 and secured in said opening by means of nuts 11 whereby the supporting member may be vertically adjusted to any desired position. The ends of the member 7 preferably overlap and are provided with elongated registering slots 12 through which a bolt 13 is extended and which carries a nut 14 so as to secure the ends of the member 7 in adjusted positions. These ends are adjustable relative to each other in order to vary the size of the member 7 so that the same may be properly adjusted between the arms 6 in order to support pails or buckets, the bottoms of which vary in diameter, it being understood that said bottoms rest upon the top edge of the member 7.

What is claimed is:—

A device of the class described, comprising a base, resilient arms extending upwardly from said base and provided with vertically alined openings, a supporting member disposed between said arms and formed from a single length of material having its ends overlapping and provided with registered slots, means engaging in said slots for securing the ends in adjusted positions whereby to permit of variations being made in the sides of said supporting member, bolts carried by said supporting member and extending through the openings in said arms whereby to permit of a vertical adjustment of said supporting member, and means engaging said bolts to secure said supporting member in adjusted positions.

In testimony whereof, I affix my signature in the presence of two witnesses.

PAUL H. BLACK.

Witnesses:
J. W. SULLIVAN,
S. E. MCMAHON.

Copies of this patent may be obtained for five cents each, by addressing the "Commissioner of Patents, Washington, D. C."